US012638627B2

(12) United States Patent
Igeta et al.

(10) Patent No.: US 12,638,627 B2
(45) Date of Patent: May 26, 2026

(54) MANUFACTURING METHOD OF LIQUID CRYSTAL OPTICAL ELEMENT

(71) Applicant: Japan Display Inc., Tokyo (JP)

(72) Inventors: Koichi Igeta, Tokyo (JP); Yasushi Tomioka, Tokyo (JP); Hiroumi Kinjo, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/645,884

(22) Filed: Apr. 25, 2024

(65) Prior Publication Data

US 2024/0361505 A1      Oct. 31, 2024

(30) Foreign Application Priority Data

Apr. 26, 2023     (JP) ................................. 2023-072451

(51) Int. Cl.
     *G02B 5/30*          (2006.01)
     *G02B 5/18*          (2006.01)
(52) U.S. Cl.
     CPC ......... *G02B 5/3016* (2013.01); *G02B 5/1833* (2013.01); *G02B 5/1847* (2013.01); *G02F 2202/28* (2013.01)
(58) Field of Classification Search
     CPC ... G02B 5/3016; G02B 5/1833; G02B 5/1847
     See application file for complete search history.

(56) References Cited

U.S. PATENT DOCUMENTS

| | | | | |
|---|---|---|---|---|
| 6,638,582 | B1 * | 10/2003 | Uchiyama | G02B 5/3083 |
| | | | | 428/1.2 |
| 10,884,309 | B2 * | 1/2021 | Lu | G02B 27/0172 |
| 2002/0110651 | A1 * | 8/2002 | Suzushi | G02B 5/3016 |
| | | | | 252/299.01 |
| 2002/0151627 | A1 * | 10/2002 | Matsushima | C09J 5/06 |
| | | | | 257/E21.503 |
| 2006/0038929 | A1 * | 2/2006 | Wang | G02F 1/13 |
| | | | | 349/18 |
| 2009/0215351 | A1 * | 8/2009 | Kobayashi | G02F 1/133308 |
| | | | | 445/24 |
| 2011/0230609 | A1 * | 9/2011 | Oshita | C08G 18/4238 |
| | | | | 524/80 |
| 2016/0033698 | A1 | 2/2016 | Escuti et al. | |
| 2019/0310488 | A1 * | 10/2019 | Taguchi | B32B 17/10 |
| 2020/0050031 | A1 * | 2/2020 | Lu | G02F 1/0322 |
| 2021/0255670 | A1 * | 8/2021 | Lee | B32B 17/06 |
| 2022/0382060 | A1 * | 12/2022 | Sato | G02B 27/0172 |
| 2023/0240947 | A1 * | 8/2023 | Kakinuma | A61K 6/30 |
| | | | | 106/35 |

FOREIGN PATENT DOCUMENTS

JP          2017522601 A      8/2017

* cited by examiner

*Primary Examiner* — David Y Chung
(74) *Attorney, Agent, or Firm* — Maier & Maier, PLLC

(57)                    ABSTRACT

A manufacturing method of a liquid crystal optical element includes preparing a liquid crystal film having a cholesteric liquid crystal, preparing a transparent substrate in which at least a material forming a main surface is an inorganic material, applying a solution containing a silane coupling agent to the main surface of the transparent substrate, stacking the liquid crystal film on the silane coupling agent, and heating the silane coupling agent.

3 Claims, 12 Drawing Sheets

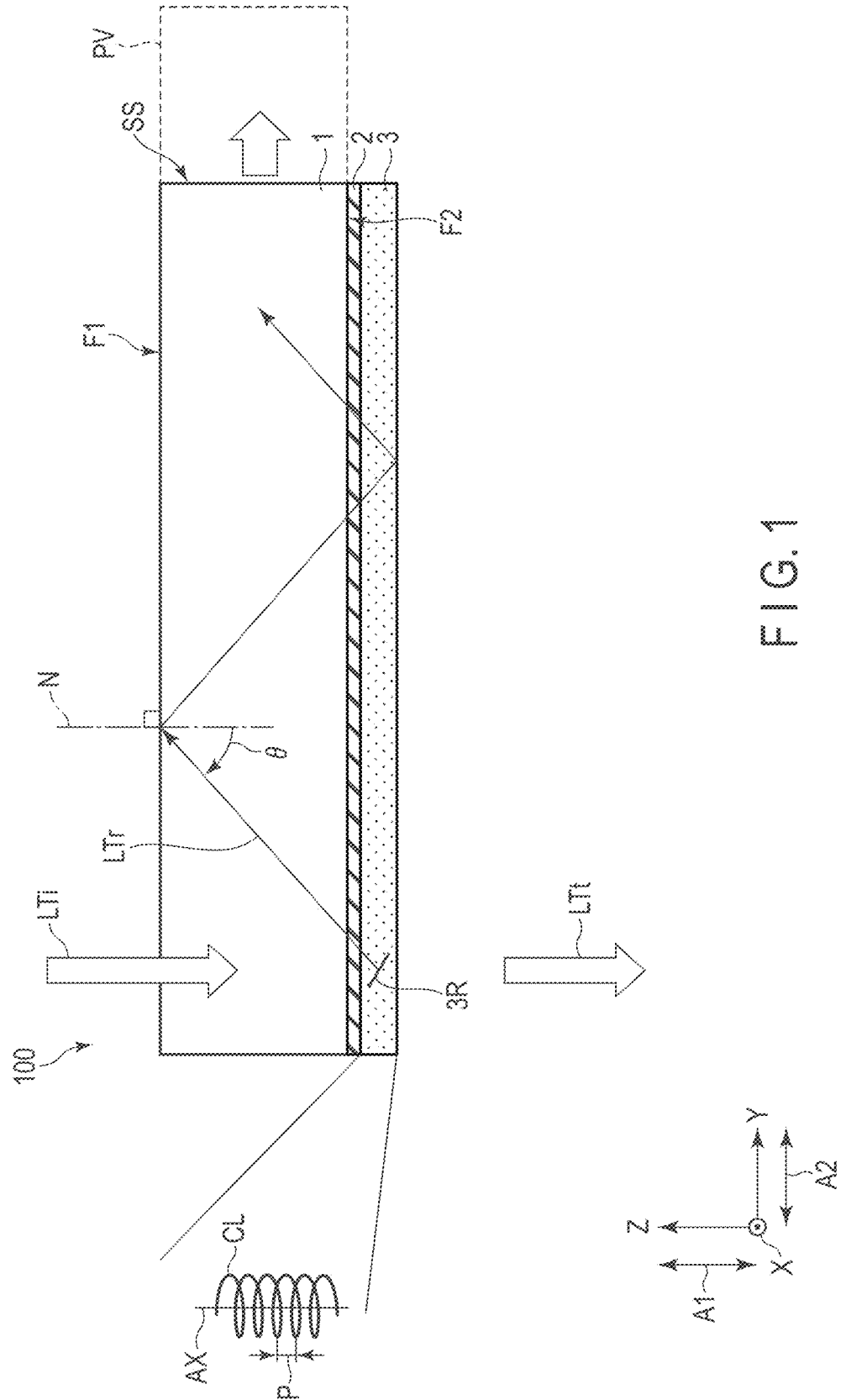
F I G. 1

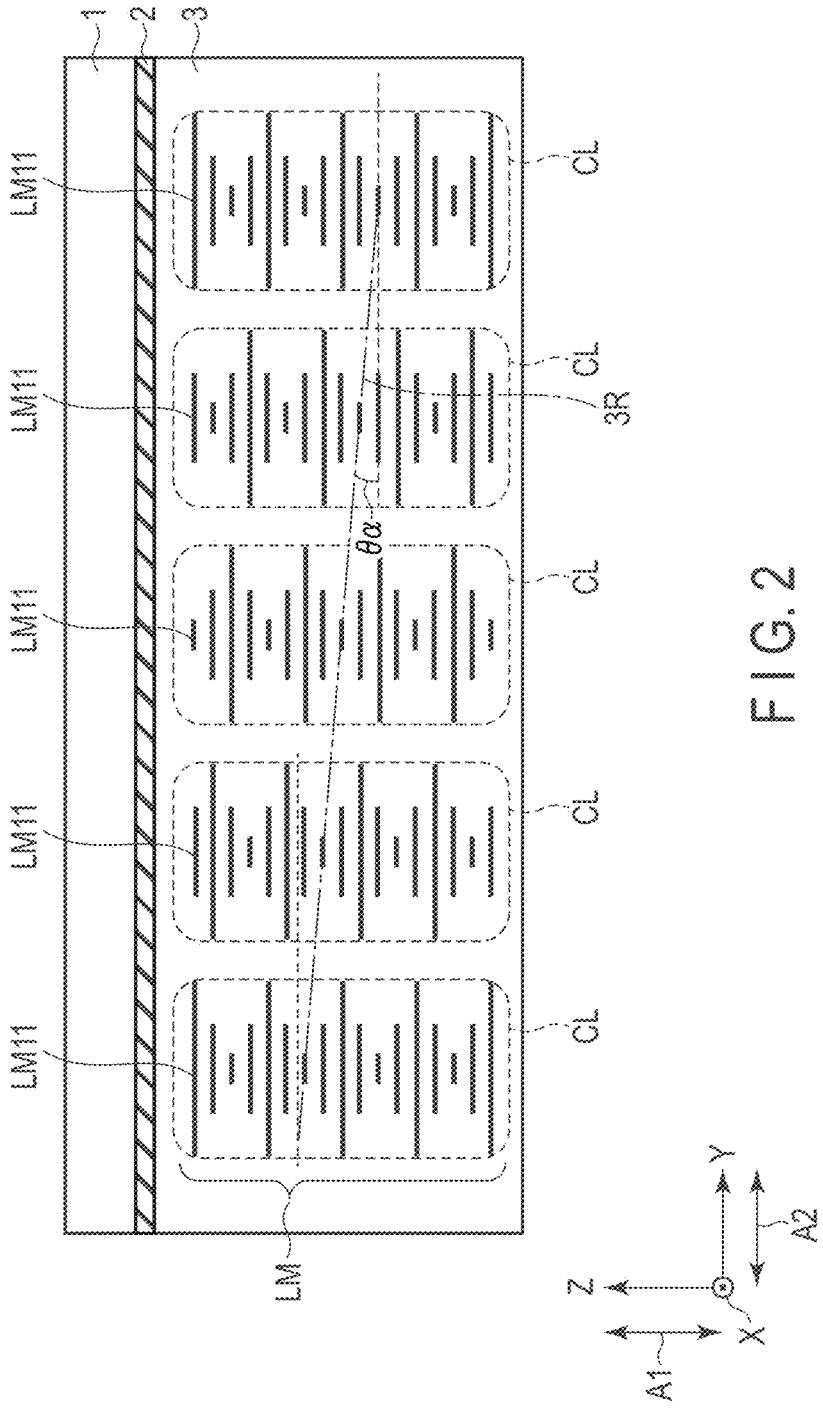
F I G. 2

FIG.4

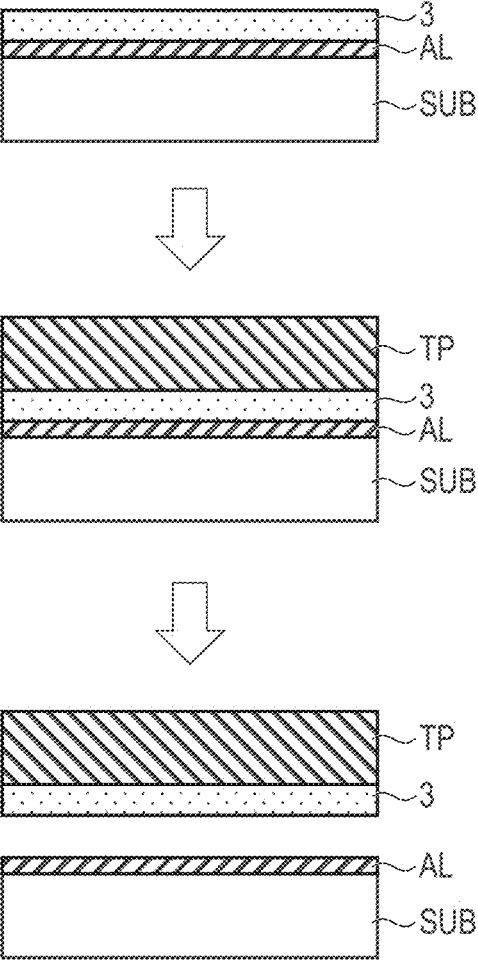
F I G. 6

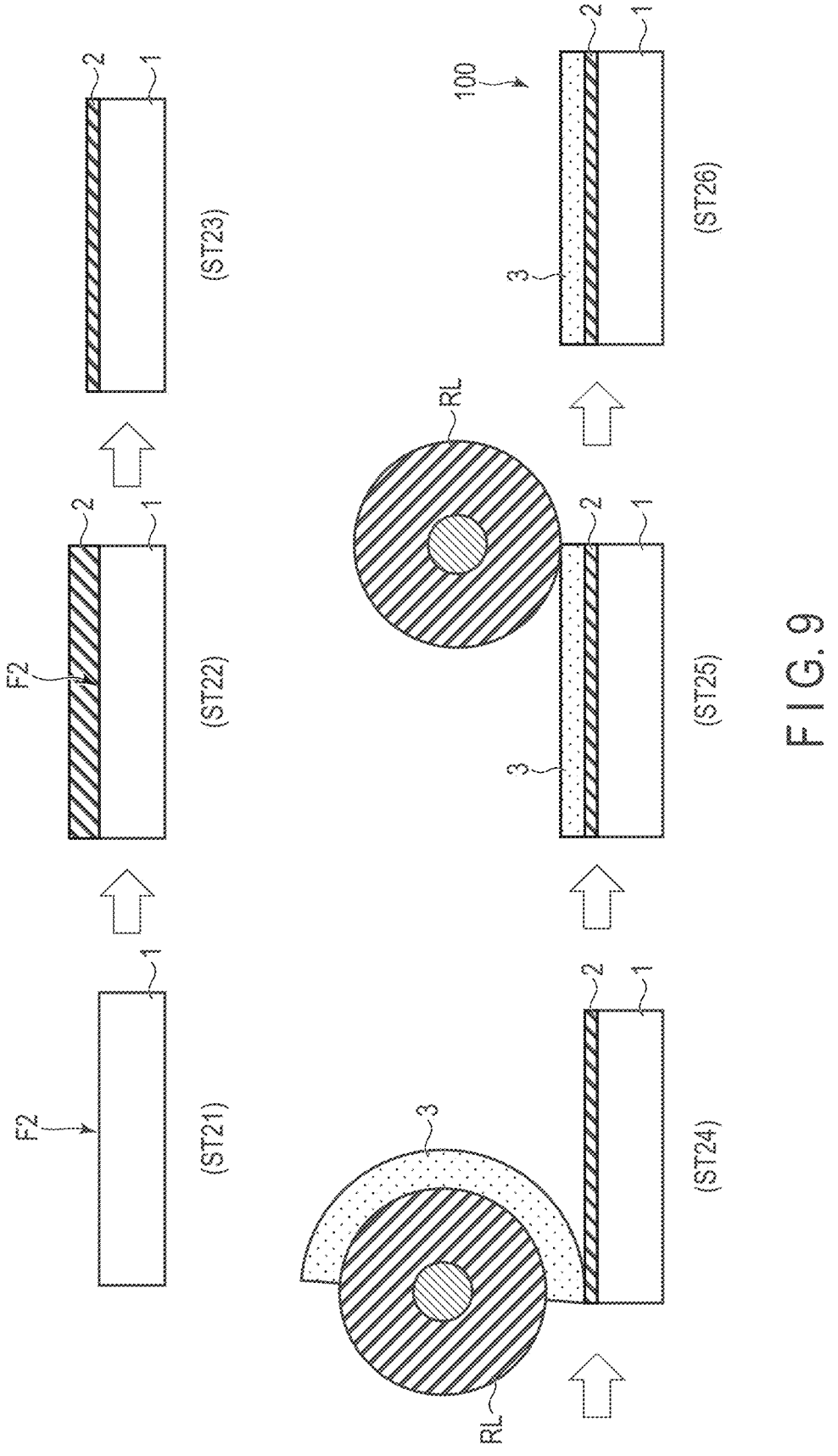
F I G. 9

$$(CH_3)_n$$

$$Y \longrightarrow Si \longrightarrow (OR)_{3-n}$$

Y: Epoxy group, styryl group, mercapto group,
   isocyanate group, methacryl group,
   acrylic group, amino group OR: Methoxy group, ethoxy group, acetyl group

F I G. 10

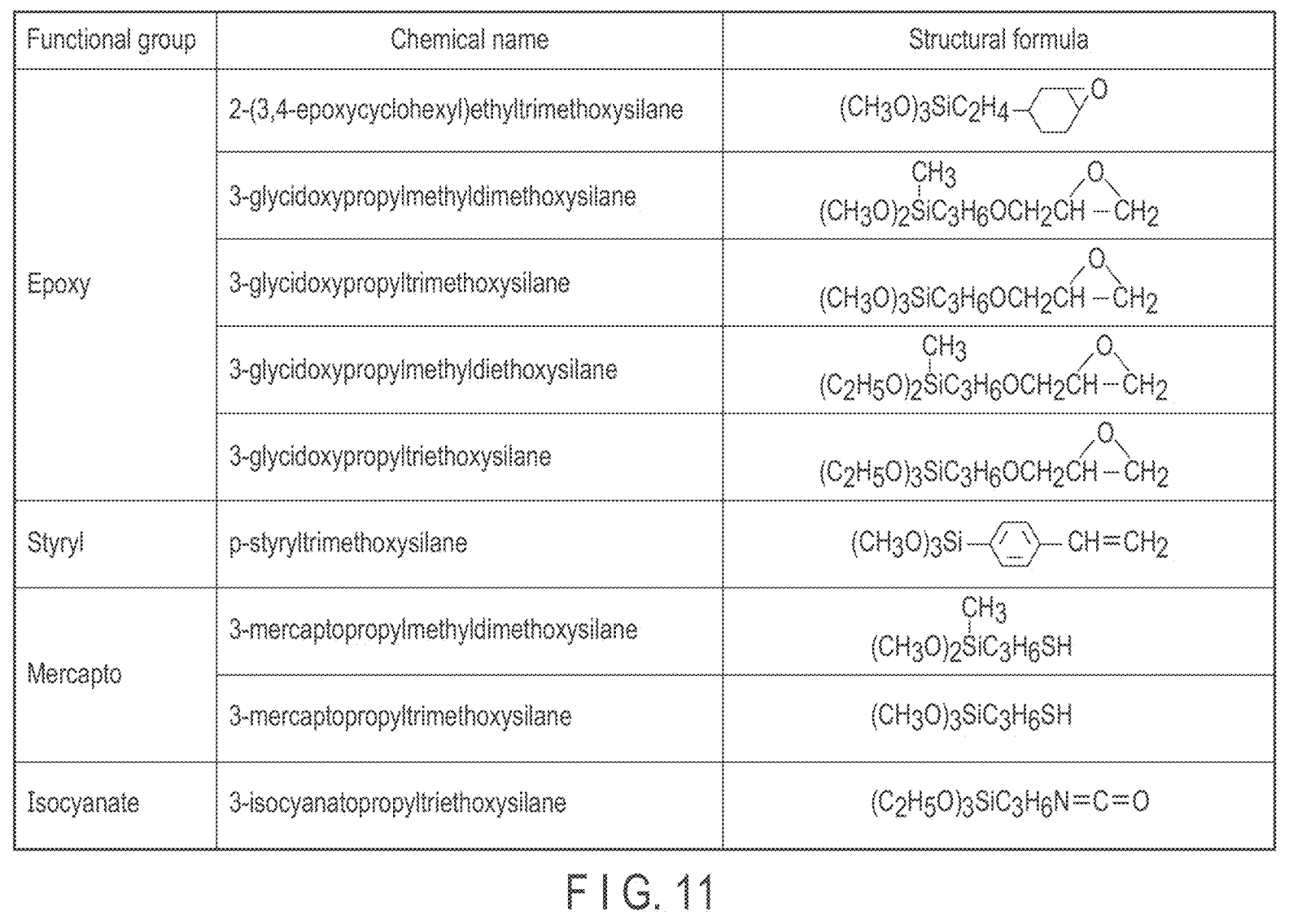

| Functional group | Chemical name | Structural formula |
|---|---|---|
| Epoxy | 2-(3,4-epoxycyclohexyl)ethyltrimethoxysilane | $(CH_3O)_3SiC_2H_4$ — (cyclohexyl with epoxy O) |
| | 3-glycidoxypropylmethyldimethoxysilane | $CH_3$<br>$(CH_3O)_2SiC_3H_6OCH_2CH$ — $CH_2$ (epoxy O) |
| | 3-glycidoxypropyltrimethoxysilane | $(CH_3O)_3SiC_3H_6OCH_2CH$ — $CH_2$ (epoxy O) |
| | 3-glycidoxypropylmethyldiethoxysilane | $CH_3$<br>$(C_2H_5O)_2SiC_3H_6OCH_2CH$ — $CH_2$ (epoxy O) |
| | 3-glycidoxypropyltriethoxysilane | $(C_2H_5O)_3SiC_3H_6OCH_2CH$ — $CH_2$ (epoxy O) |
| Styryl | p-styryltrimethoxysilane | $(CH_3O)_3Si$ — (phenyl) — $CH=CH_2$ |
| Mercapto | 3-mercaptopropylmethyldimethoxysilane | $CH_3$<br>$(CH_3O)_2SiC_3H_6SH$ |
| | 3-mercaptopropyltrimethoxysilane | $(CH_3O)_3SiC_3H_6SH$ |
| Isocyanate | 3-isocyanatopropyltriethoxysilane | $(C_2H_5O)_3SiC_3H_6N=C=O$ |

F I G. 11

| Functional group | Chemical name | Structural formula |
|---|---|---|
| Methacryl | 3-methacryloxypropylmethyldimethoxysilane | $(CH_3O)_2SiC_3H_6O\underset{\underset{O}{\parallel}}{C}\underset{CH_3}{C}=CH_2$ |
| | 3-methacryloxypropyltrimethoxysilane | $(CH_3O)_3SiC_3H_6O\underset{\underset{O}{\parallel}}{C}\underset{CH_3}{C}=CH_2$ |
| | 3-methacryloxypropylmethyldiethoxysilane | $(C_2H_5O)_2SiC_3H_6O\underset{\underset{O}{\parallel}}{C}\underset{CH_3}{C}=CH_2$ |
| | 3-methacryloxypropyltriethoxysilane | $(C_2H_5O)_3SiC_3H_6O\underset{\underset{O}{\parallel}}{C}\underset{CH_3}{C}=CH_2$ |
| Acryl | 3-acryloxypropyltrimethoxysilane | $(CH_3O)_3SiC_3H_6O\underset{\underset{O}{\parallel}}{C}CH=CH_2$ |
| Amino | N-2-(aminoethyl)-3-aminopropylmethyldimethoxysilane | $(CH_3O)_2SiC_3H_6NHC_2H_4NH_2$ |
| | N-2-(aminoethyl)-3-aminopropyltrimethoxysilane | $(CH_3O)_3SiC_3H_6NHC_2H_4NH_2$ |
| | 3-aminopropyltrimethoxysilane | $(CH_3O)_3SiC_3H_6NH_2$ |
| | 3-aminopropyltriethoxysilane | $(C_2H_5O)_3SiC_3H_6NH_2$ |
| | 3-triethoxysilyl-N-(1,3-dimethyl-butylidene)-propylamine | $(C_2H_5O)_3SiC_3H_6N=C\begin{smallmatrix}C_4H_9\\CH_3\end{smallmatrix}$ |
| | N-phenyl-3-aminopropyltrimethoxysilane | $(CH_3O)_3SiC_3H_6NH-$⬡ |

F I G. 12

MANUFACTURING METHOD OF LIQUID CRYSTAL OPTICAL ELEMENT

CROSS-REFERENCE TO RELATED APPLICATIONS

This application is based upon and claims the benefit of priority from Japanese Patent Application No. 2023-072451, filed Apr. 26, 2023, the entire contents of which are incorporated herein by reference.

FIELD

Embodiments described herein relate generally to a manufacturing method of a liquid crystal optical element.

BACKGROUND

For example, a liquid crystal polarization grating using a liquid crystal material is suggested. This liquid crystal polarization grating requires the adjustment of parameters such as a grating period, the refractive anisotropy $\Delta n$ of a liquid crystal layer (the difference between refractive index ne for extraordinary light and refractive index no for ordinary light in a liquid crystal layer) and the thickness d of the liquid crystal layer.

BRIEF DESCRIPTION OF THE DRAWINGS

FIG. 1 is a cross-sectional view schematically showing a liquid crystal optical element 100.

FIG. 2 is a diagram for explaining an example of cholesteric liquid crystals CL contained in a liquid crystal film 3.

FIG. 4 shows an example of main materials constituting a liquid crystal material.

FIG. 6 is a diagram for explaining an example of the process of preparing the liquid crystal film.

FIG. 9 is a diagram for explaining another example of the manufacturing method of the liquid crystal optical element 100.

FIG. 10 is a diagram schematically showing the chemical structure of a silane coupling agent.

FIG. 11 is a diagram showing examples of the silane coupling agent.

FIG. 12 is a diagram showing other examples of the silane coupling agent.

DETAILED DESCRIPTION

Figure 3:
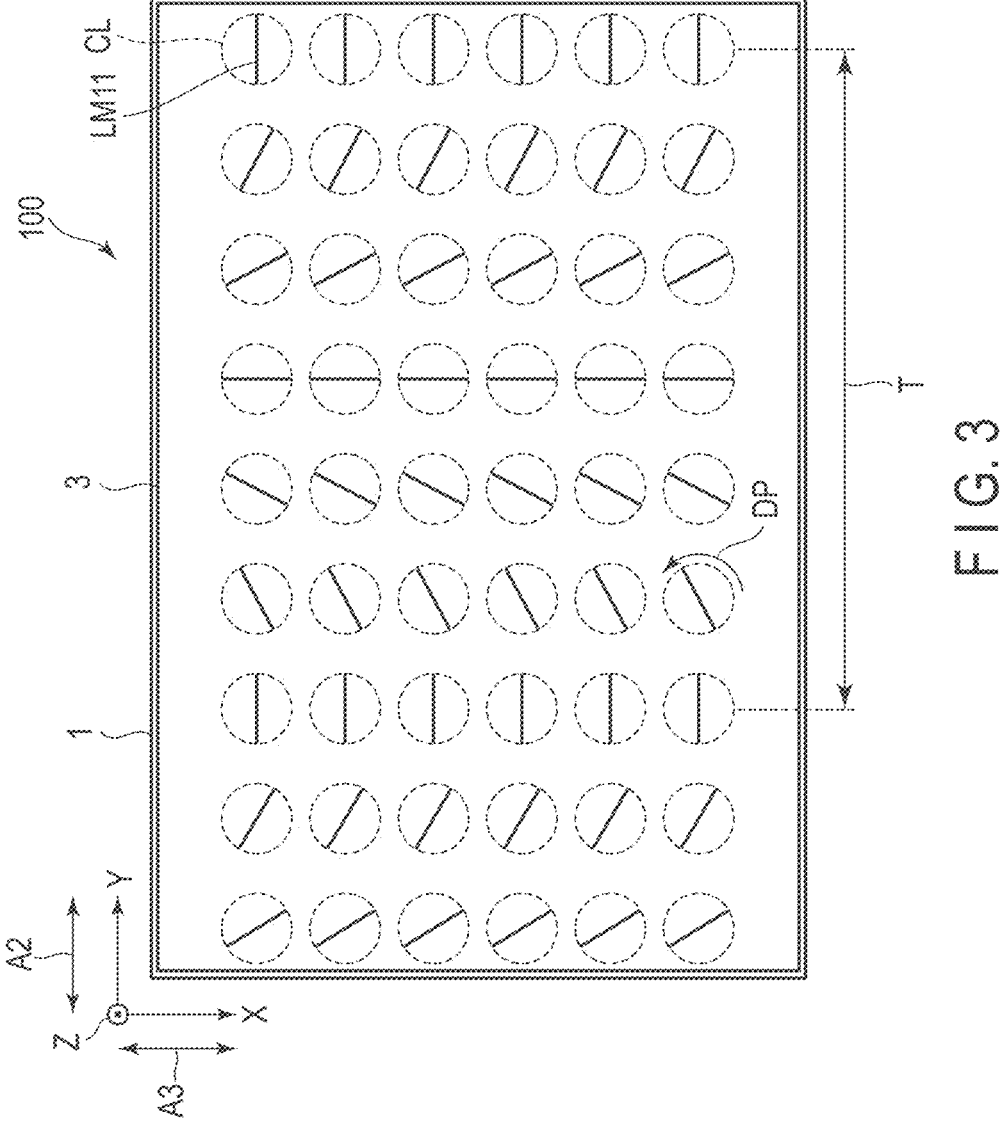
FIG. 3 is a plan view schematically showing the liquid crystal optical element 100.

Embodiments described herein aim to provide a manufacturing method of a liquid crystal optical element which can prevent the peel-off of a liquid crystal film.

In general, according to one embodiment, a manufacturing method of a liquid crystal optical element comprises preparing a liquid crystal film having a cholesteric liquid crystal, preparing a transparent substrate in which at least a material forming a main surface is an inorganic material, applying a solution containing a silane coupling agent to the main surface of the transparent substrate, stacking the liquid crystal film on the silane coupling agent, and heating the silane coupling agent.

According to another embodiment, a liquid crystal optical element comprises a liquid crystal film having a cholesteric liquid crystal, a transparent substrate in which at least a material forming a main surface is an inorganic material, and an adhesive layer containing a silane coupling agent and provided on the main surface of the transparent substrate. The liquid crystal film is stacked on the adhesive layer. The adhesive layer is transparent. The liquid crystal film is thermo-chemically bonded to the transparent substrate via the adhesive layer. The transparent substrate, the adhesive layer and the liquid crystal film have substantially same refractive index.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the Z-axis is referred to as a Z-direction or a first direction A1. A direction parallel to the Y-axis is referred to as a Y-direction or a second direction A2. A direction parallel to the X-axis is referred to as an X-direction or a third direction A3. The plane defined by the X-axis and the Y-axis is referred to as an X-Y plane. The plane defined by the X-axis and the Z-axis is referred to as an X-Z plane. The plane defined by the Y-axis and the Z-axis is referred to as a Y-Z plane.

FIG. 1 is a cross-sectional view schematically showing a liquid crystal optical element 100.

The liquid crystal optical element 100 comprises a transparent substrate 1, an adhesive layer 2 and a liquid crystal film 3.

The transparent substrate 1 consists of, for example, a transparent glass plate or a transparent synthetic resin plate. The transparent substrate 1 may consist of, for example, a transparent synthetic resin plate having flexibility. The transparent substrate 1 could have an arbitrary shape. For example, the transparent substrate 1 may be curved.

In this specification, the term "light" includes visible light and invisible light. For example, the wavelength of the lower limit of the visible light range is greater than or equal to 360 nm and less than or equal to 400 nm. The wavelength of the upper limit of the visible light range is greater than or equal to 760 nm and less than or equal to 830 nm. Visible light includes the first component (blue component) of a first wavelength range (for example, 400 nm to 500 nm), the second component (green component) of a second wavelength range (for example, 500 nm to 600 nm), and the third component (red component) of a third wavelength range (for example, 600 nm to 700 nm). Invisible light includes the wavelength range of ultraviolet light in which the wavelength is shorter than the first wavelength range, and the wavelength range of infrared light in which the wavelength is longer than the third wavelength range.

In this specification, the term "transparent" should preferably mean colorless and transparent. However, the term "transparent" may mean semitransparent, or colored and transparent.

The transparent substrate 1 is shaped like a flat plate parallel to an X-Y plane and has a main surface (outer surface) F1, a main surface (inner surface) F2 and a side surface SS. The main surface F1 and the main surface F2 are surfaces substantially parallel to the X-Y plane and face each other in a first direction A1. The side surface SS is a surface extending in the first direction A1. In the example shown in FIG. 1, the side surface SS is a surface substantially parallel to an X-Z plane. The side surface SS includes a surface substantially parallel to a Y-Z plane.

The adhesive layer 2 is provided on the main surface F2.

The liquid crystal film 3 is attached to the transparent substrate 1 via the adhesive layer 2. The liquid crystal film 3 has a cholesteric liquid crystal CL as schematically shown in the enlarged view. The cholesteric liquid crystal CL has a helical axis AX substantially parallel to the first direction A1 and has a helical pitch P parallel to the first direction A1. The helical pitch P indicates one period of the helix (in other words, the layer thickness parallel to the helical axis AX and required for a 360-degree rotation of the liquid crystal molecule).

This liquid crystal film 3 is configured to reflect, of light LTi which enters the liquid crystal optical element 100, circularly polarized light having a selective reflection range determined based on the helical pitch P and the refractive anisotropy $\Delta n$ of the liquid crystal film 3. In this specification, reflection in the liquid crystal film 3 is accompanied by diffraction inside the liquid crystal film 3.

The liquid crystal film 3 has a reflective surface 3R which reflects circularly polarized light corresponding to the twist direction of the cholesteric liquid crystal CL in the selective reflection range. The reflective surface 3R inclines with respect to the X-Y plane. In this specification, circularly polarized light may be strict circularly polarized light or may be circularly polarized light which approximates elliptically polarized light.

In the example shown in FIG. 1, the liquid crystal film 3 is configured such that part of light LTi which enters the liquid crystal optical element 100 from the main surface F1 side is reflected toward the transparent substrate 1.

It should be noted that a liquid crystal film which contains another cholesteric liquid crystal may be stacked in the liquid crystal film 3 shown in FIG. 1 in the liquid crystal optical element 100. Such a cholesteric liquid crystal is, for example, a cholesteric liquid crystal having a helical pitch which is different from the helical pitch P or a cholesteric liquid crystal which twists in the opposite direction of the twist direction of the cholesteric liquid crystal CL shown in the figure.

Now, this specification explains the optical effect of the liquid crystal optical element 100 shown in FIG. 1.

Light LTi which enters the liquid crystal optical element 100 includes, for example, visible light, ultraviolet light and infrared light.

In the example shown in FIG. 1, in order to facilitate understanding, light LTi is assumed to enter the transparent substrate 1 so as to be substantially perpendicular to the transparent substrate 1. It should be noted that the incident angle of light LTi with respect to the transparent substrate 1 is not particularly limited.

Light LTi passes through the transparent substrate 1 and enters the liquid crystal film 3. The liquid crystal film 3 reflects part of light LTi on the reflective surface 3R and transmits the other part of light LTi (in other words, light LTt). The reflected light LTr is circularly polarized light having a wavelength $\lambda$.

For example, light LTr is left-handed circularly polarized light having the wavelength range of infrared light. Light LTt includes right-handed circularly polarized light having the wavelength range of infrared light in addition to visible light and ultraviolet light.

The entering angle $\theta$ of light LTr reflected on the liquid crystal film 3 is set so as to satisfy optical waveguide conditions. Here, the entering angle $\theta$ corresponds to an angle greater than or equal to a critical angle which causes total reflection on the interface between the liquid crystal film 3 and air. The entering angle $\theta$ indicates an angle with respect to the normal N of the transparent substrate 1.

When the transparent substrate 1, the adhesive layer 2 and the liquid crystal film 3 have substantially the same refractive index, a stacked layer body of these substrate and film could be a light guide element as a single unit. In this case, light LTr is guided toward the side surface SS while repeating reflection on the interface between the transparent substrate 1 and air and the interface between the liquid crystal film 3 and air.

This liquid crystal optical element 100 can be applied as, for example, the light guide element of a solar battery device. The solar battery device comprises the liquid crystal optical element 100 and a solar battery PV shown by dotted lines in FIG. 1. The solar battery PV is provided so as to face the side surface SS. The solar battery PV can receive light LTr emitted from the side surface SS and generate electricity.

In the example explained above, infrared light is reflected on the liquid crystal film 3. However, the liquid crystal film 3 may be configured to reflect visible light, or may be configured to reflect ultraviolet light or may be configured to reflect light in a plurality of wavelength ranges.

FIG. 2 is a diagram for explaining an example of cholesteric liquid crystals CL contained in the liquid crystal film 3.

In FIG. 2, the liquid crystal film 3 is enlarged in the first direction A1. In addition, to simplify the illustration, FIG. 2 shows one liquid crystal molecule LM among the liquid crystal molecules located on the same plane parallel to the X-Y plane as the liquid crystal molecules constituting each cholesteric liquid crystal CL. The alignment direction of the liquid crystal molecule LM shown in the figure corresponds to the average alignment direction of the liquid crystal molecules located on the same plane.

When one of the cholesteric liquid crystals CL surrounded by dotted lines is particularly looked at, the cholesteric liquid crystal CL consists of a plurality of liquid crystal molecules LM which are helically stacked in the first direction A1 while twisting. The liquid crystal molecules LM have a liquid crystal molecule LM11 located near the interface between the adhesive layer 2 and the liquid crystal film 3.

In the liquid crystal film 3 of the example shown in FIG. 2, the alignment directions of the cholesteric liquid crystals CL which are adjacent to each other in a second direction A2 are different from each other. Further, the spacial phases of the cholesteric liquid crystals CL which are adjacent to each other in the second direction A2 are different from each other.

The alignment directions of the liquid crystal molecules LM11 which are adjacent to each other in the second direction A2 are different from each other. The alignment directions of a plurality of liquid crystal molecules LM11 continuously change in the second direction A2.

The reflective surface 3R of the liquid crystal film 3 shown by the one-dot chain line in the figure inclines with respect to the X-Y plane. The angle θα between the reflective surface 3R and the X-Y plane is an acute angle. The reflective surface 3R corresponds to a surface in which the alignment directions of the liquid crystal molecules LM are uniform, or a surface (an equiphase wave surface) in which the spacial phase is uniform.

This liquid crystal film 3 is cured in a state where the alignment directions of the liquid crystal molecules LM are fixed. In other words, an electric field does not control the alignment directions of the liquid crystal molecules LM. For this reason, the liquid crystal optical element 100 does not comprise an electrode for forming an electric field in the liquid crystal film 3.

In general, in the liquid crystal film 3 having cholesteric liquid crystals CL, the selective reflection range Δλ for the light which underwent perpendicular incidence is shown by the following formula (1) based on the helical pitch P of the cholesteric liquid crystals CL and the refractive anisotropy Δn of the liquid crystal film 3 (the difference between refractive index ne for extraordinary light and refractive index no for ordinary light).

$$\Delta\lambda = \Delta n * P \qquad (1)$$

The specific wavelength range of the selective reflection range Δλ is a range from (no*P) or greater to (ne*P) or less.

The center wavelength λm of the selective reflection range Δλ is shown by the following formula (2) based on the helical pitch P of the cholesteric liquid crystals CL and the average refractive index nav (=(ne+no)/2) of the liquid crystal film 3.

$$\lambda m = nav * P \qquad (2)$$

FIG. 3 is a plan view schematically showing the liquid crystal optical element 100.

FIG. 3 shows an example of the spacial phases of cholesteric liquid crystals CL. Here, the spacial phases are shown as the alignment directions of the liquid crystal molecules LM11 located near the adhesive layer 2 among the liquid crystal molecules LM contained in cholesteric liquid crystals CL.

Regarding the cholesteric liquid crystals CL arranged in the second direction A2, the alignment directions of the liquid crystal molecules LM11 are different from each other. In other words, the spacial phases of the cholesteric liquid crystals CL differ in the second direction A2.

To the contrary, regarding the cholesteric liquid crystals CL arranged in a third direction A3, the alignment directions of the liquid crystal molecules LM11 are substantially coincident with each other. In other words, the spacial phases of the cholesteric liquid crystals CL are substantially coincident with each other in the third direction A3.

In particular, regarding the cholesteric liquid crystals CL arranged in the second direction A2, the alignment direction varies with each liquid crystal molecule LM11 by a certain degree. In other words, the alignment direction linearly varies with the liquid crystal molecules LM11 arranged in the second direction A2. Thus, the spacial phase linearly varies in the second direction A2 with the cholesteric liquid crystals CL arranged in the second direction A2. As a result, the reflective surface 3R which inclines with respect to the X-Y plane is formed like the liquid crystal film 3 shown in FIG. 2. Here, the phrase "linearly vary" means that, for example, the amount of variation in the alignment directions of the liquid crystal molecules LM11 is shown by a linear function. Here, the alignment direction of each liquid crystal molecule LM11 corresponds to the long axis direction of the liquid crystal molecule LM11 on the X-Y plane.

Here, the interval between two liquid crystal molecules LM11 when the alignment directions of the liquid crystal molecules LM11 vary by 180 degrees in the second direction A2 on a plane is defined as period T. In FIG. 3, DP indicates the twist direction of each liquid crystal molecule LM11. The inclination angle θα of the reflective surface 3R shown in FIG. 2 is arbitrarily set based on the period T and the helical pitch P. The period T is, for example, 1000 nm to 3000 nm. As another example, the period T is 300 nm to 700 nm.

Now, this specification explains the liquid crystal film 3.

The liquid crystal film 3 is prepared by polymerizing liquid crystal monomers having a functional group such as a methacryl group, an acrylic group, a vinyl group or a vinyl ether group.

The liquid crystal material for forming the liquid crystal film 3 mainly contains liquid crystal monomers, a polymerization initiator and a solvent. When the liquid crystal film 3 contains the above cholesteric liquid crystals CL, the liquid crystal material further contain a chiral dopant.

Figure 4:
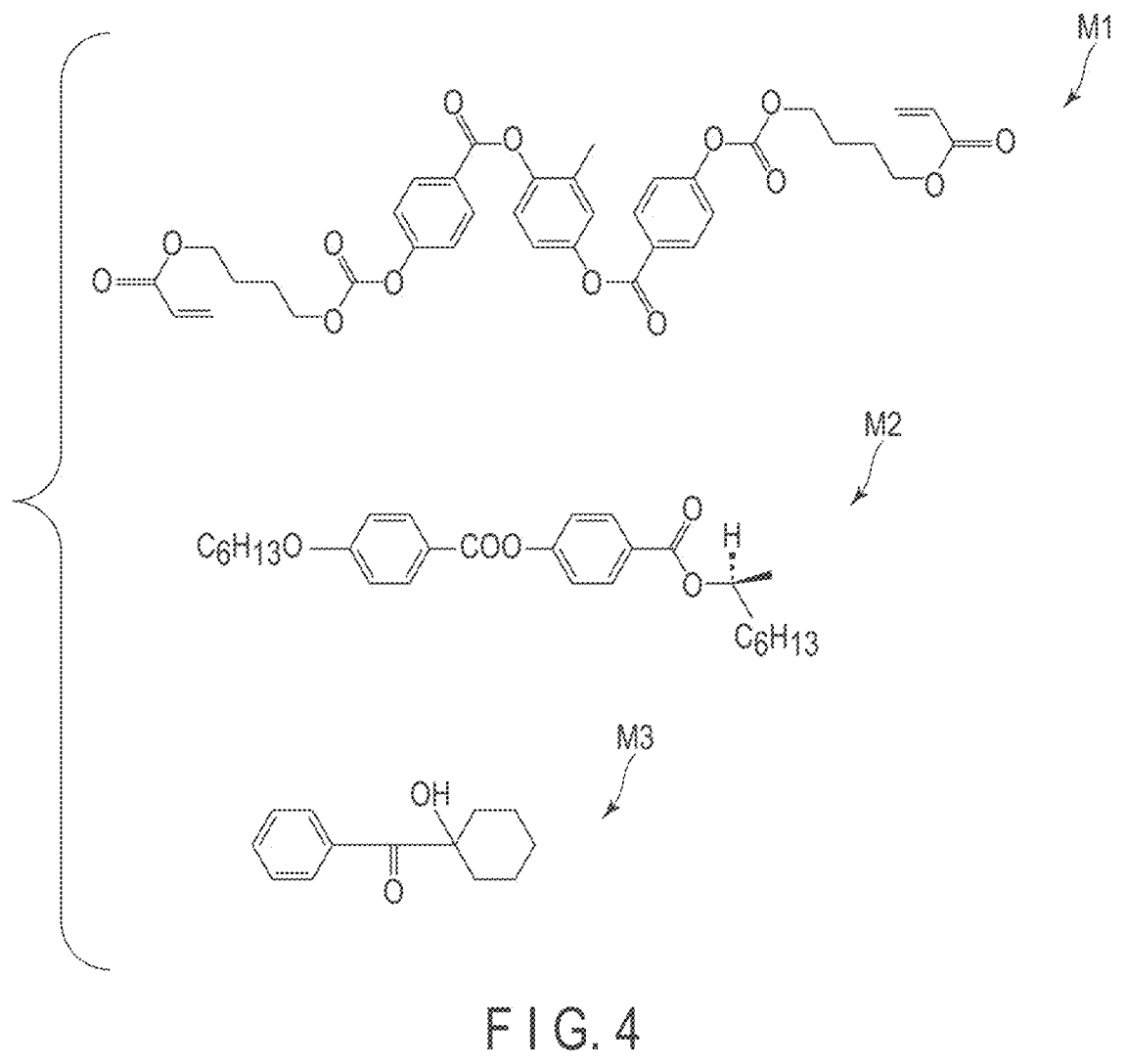

FIG. 4 shows an example of main materials constituting the liquid crystal material.

Material M1 corresponds to an example of the liquid crystal monomers.

Material M2 corresponds to an example of the chiral dopant.

Material M3 corresponds to an example of the polymerization initiator.

The solvent is, for example, hexane, cyclohexane, cyclohexanone, heptane, toluene, anisole or propylene glycol monomethyl ether acetate (PGMEA).

Figure 5:
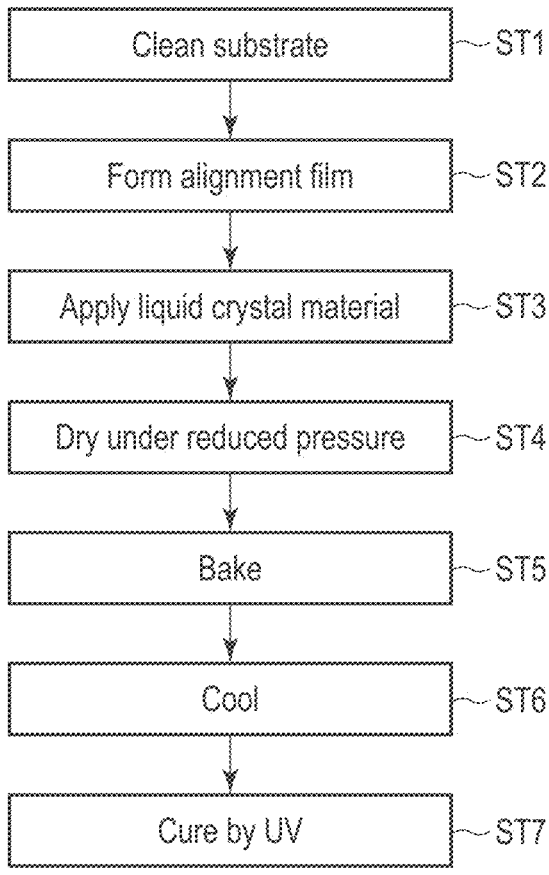
FIG. 5 is a diagram for explaining the process of forming the liquid crystal film 3.

FIG. 5 is a diagram for explaining the process of forming the liquid crystal film 3.

First, a support substrate is cleaned (step ST1).

Subsequently, an alignment film is formed on the support substrate (step ST2). The alignment film is formed by applying an alignment treatment (photo-alignment treatment) to a thin film formed on the support substrate. The alignment film formed by this alignment treatment has an alignment axis having a predetermined pattern.

Subsequently, a liquid crystal material prepared in advance is applied onto the alignment film (step ST3).

Subsequently, the liquid crystal material is dried by decompressing the inside of the chamber (step ST4). At this time, the pressure of the inside of the chamber is set so as to be less than or equal to 100 Pa. In this state, a drying process is performed for two minutes.

Subsequently, the liquid crystal material is baked (step ST5). At this time, it is preferable that the temperature for heating the liquid crystal material should not exceed an NI point (nematic-isotropic transition temperature). Through this process, the liquid crystal molecules contained in the liquid crystal material are aligned in a predetermined direction based on the alignment axis of the alignment film. When a chiral dopant is contained in the liquid crystal material, the liquid crystal molecules are helically arranged, and a cho-lesteric liquid crystal phase is exhibited.

Subsequently, the liquid crystal material is cooled to approximately a room temperature (step ST6).

Subsequently, the liquid crystal material is cured by irradiating the liquid crystal material with ultraviolet light (step ST7). By this process, the liquid crystal film 3 having cholesteric liquid crystals CL is formed.

In the example described above, the liquid crystal film 3 has cholesteric liquid crystals CL. However, the liquid crystal film 3 may have nematic liquid crystals. The liquid crystal film 3 having nematic liquid crystals can be formed by applying a liquid crystal material which does not contain a chiral dopant as the liquid crystal material for forming the liquid crystal film 3.

FIG. 6 is a diagram for explaining an example of the process of preparing the liquid crystal film.

First, as shown in the upper part of FIG. 6, the liquid crystal film 3 is formed on the support substrate SUB via the alignment film AL. The process of forming the liquid crystal film 3 is as explained with reference to FIG. 5.

Subsequently, as shown in the middle part of FIG. 6, a thermal release tape TP is attached to the liquid crystal film 3. The thermal release tape TP may be attached to the whole surface of the liquid crystal film 3 or may be attached to part of the liquid crystal film 3.

Subsequently, as shown in the lower part of FIG. 6, the liquid crystal film 3 attached to the thermal release tape TP is peeled from the alignment film AL. By this process, the liquid crystal film 3 is prepared.

Now, this specification explains the manufacturing method of the liquid crystal optical element 100.

Figure 7:
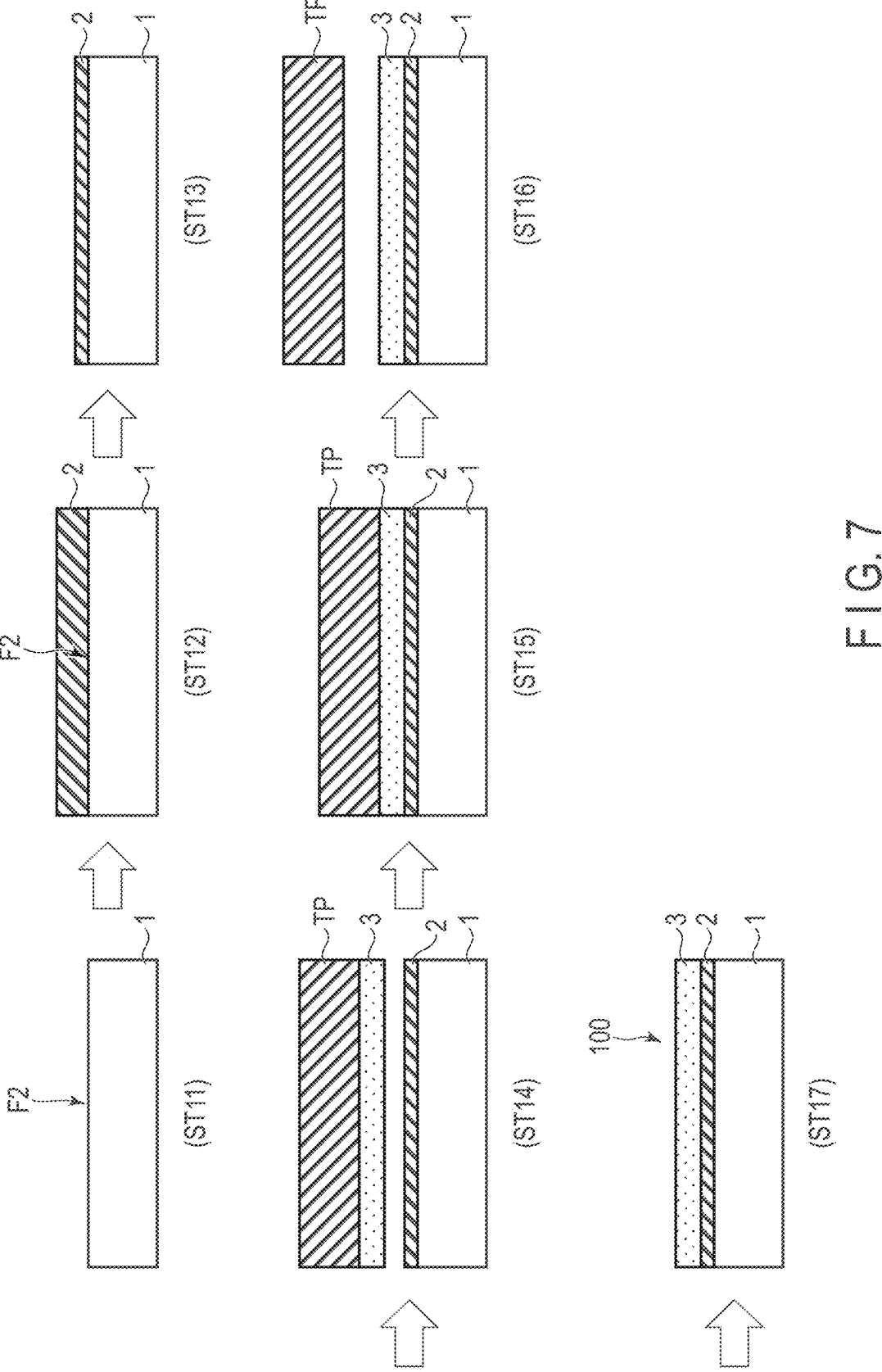
FIG. 7 is a diagram for explaining an example of the manufacturing method of the liquid crystal optical element 100.

FIG. 7 is a diagram for explaining an example of the manufacturing method of the liquid crystal optical element 100.

First, the transparent substrate 1 is prepared (step ST11). In the transparent substrate 1, at least the material which forms the main surface F2 is an inorganic material.

For example, to the transparent substrate 1, a glass substrate which is mainly formed of silicon oxide (SiO$_2$), such as soda-lime glass, borosilicate glass or quartz glass, can be applied.

Alternatively, as another example of the transparent substrate 1, a substrate on which an inorganic film of silicon nitride (SiN), silicon oxide (SiO$_2$), etc., is formed on the surface of transparent resin such as acryl, polyethylene terephthalate, polycarbonate or polyvinyl chloride can be also applied. In this case, the surface of the inorganic film corresponds to the main surface F2.

Subsequently, a solution containing a silane coupling agent is applied as the adhesive layer 2 to the main surface F2 of the transparent substrate 1 (step ST12). The silane coupling agent is an organosilicon compound having an alkoxy group and a reactive functional group. The solution is an aqueous solution or alcohol solution which contains the silane coupling agent in a range greater than or equal to 0.1% by weight and less than or equal to 3.0% by weight.

Subsequently, the solution containing the silane coupling agent is dried (step ST13). By this process, the adhesive layer 2 of the silane coupling agent is formed.

Subsequently, the liquid crystal film 3 which is attached to the thermal release tape TP through the processes shown in FIG. 5 and FIG. 6 is prepared, and the liquid crystal film 3 is stacked on the adhesive layer (silane coupling agent) 2 (step ST14).

Subsequently, the thermal release tape TP is heated (step ST15). By this heating, the adhesion of the thermal release tape TP is reduced.

Subsequently, the thermal release tape TP is peeled from the liquid crystal film 3 (step ST16).

Subsequently, the adhesive layer (silane coupling agent) 2 is heated (step ST17). By this process, the alkoxy group of the silane coupling agent is chemically bonded to the inorganic material which forms the main surface F2 of the transparent substrate 1. Further, the reactive functional group of the silane coupling agent is chemically bonded to the functional group of the liquid crystal film 3 which remains in an unreacted state.

By this process, the liquid crystal optical element 100 is manufactured.

According to the liquid crystal optical element 100 which is formed through the above process, the liquid crystal film 3 is thermo-chemically bonded to the transparent substrate 1 via the adhesive layer 2. Thus, the peel-off and removal of the liquid crystal film 3 from the transparent substrate 1 can be prevented.

In addition, the adhesive layer 2 which is a silane coupling agent is transparent, and further, does not form an interface to be caused by the difference in refractive index between the transparent substrate 1 and the adhesive layer 2 or between the adhesive layer 2 and the liquid crystal film 3. For this reason, undesired scattering or undesired reflection inside the liquid crystal optical element 100 is prevented. In this manner, when the liquid crystal optical element 100 is applied as a light guide element, the decrease in light guiding efficiency can be prevented.

An alignment film formed of polyimide, etc., may be colored in some cases. To the contrary, the liquid crystal optical element 100 manufactured by the above manufacturing method does not include an alignment film. Therefore, the liquid crystal optical element 100 having a high transparency can be provided.

In the manufacturing method explained with reference to FIG. 7, the process of heating the thermal release tape TP and the process of heating the silane coupling agent are separately performed. The reason is that the temperature region which accelerates the chemical reaction of the silane coupling agent is largely different from the temperature region which reduces the adhesion of the thermal release tape TP. When the temperature region which accelerates the chemical reaction of the silane coupling agent is close to the temperature region which reduces the adhesion of the thermal release tape TP, the process of heating the thermal release tape TP of step ST15 may also function as the process of heating the silane coupling agent. In this case, the heating process of step ST17 is unnecessary.

Now, another manufacturing method is explained.

Figure 8:
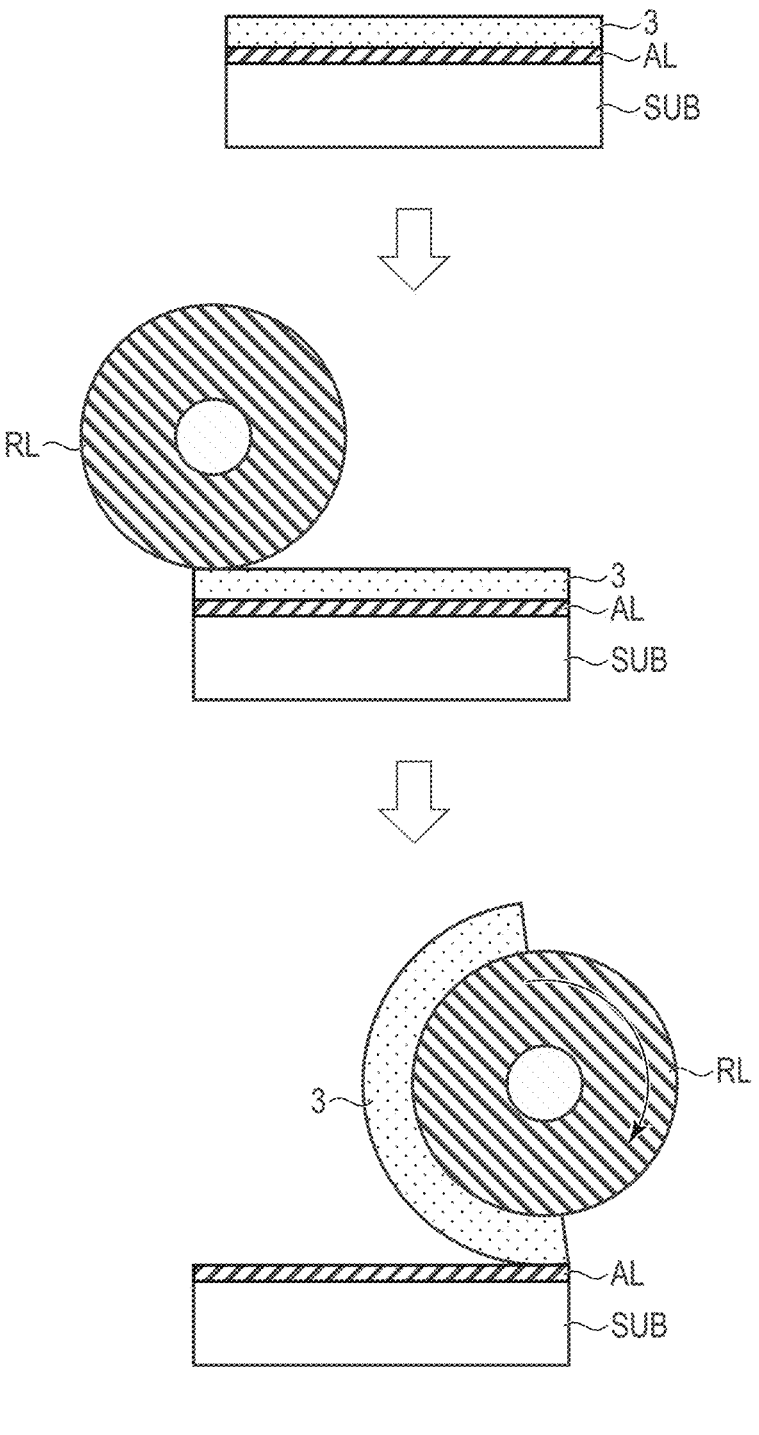
FIG. 8 is a diagram for explaining another example of the process of preparing the liquid crystal film.

FIG. 8 is a diagram for explaining another example of the process of preparing the liquid crystal film.

First, as shown in the upper part of FIG. 8, the liquid crystal film 3 is formed on the support substrate SUB via the alignment film AL. The process of forming the liquid crystal film 3 is as explained with reference to FIG. 5.

Subsequently, as shown in the middle part of FIG. 8, a roller RL is pressed against an end side of liquid crystal film 3.

Subsequently, as shown in the lower part of FIG. 8, the liquid crystal film 3 is wound onto the roller RL and is peeled from the alignment film AL. By this process, the liquid crystal film 3 is prepared.

Now, this specification explains the manufacturing method of the liquid crystal optical element 100.

FIG. 9 is a diagram for explaining another example of the manufacturing method of the liquid crystal optical element 100.

First, the transparent substrate 1 is prepared (step ST21). In a manner similar to that of the above description, in the transparent substrate 1, at least the material which forms the main surface F2 is an inorganic material.

Subsequently, a solution containing a silane coupling agent is applied as the adhesive layer 2 to the main surface F2 of the transparent substrate 1 (step ST22). The silane coupling agent is an organosilicon compound having an alkoxy group and a reactive functional group. The solution is an aqueous solution or alcohol solution which contains the silane coupling agent in a range greater than or equal to 0.1% by weight and less than or equal to 3.0% by weight.

Subsequently, the solution containing the silane coupling agent is dried (step ST23). By this process, the adhesive layer 2 of the silane coupling agent is formed.

Subsequently, the liquid crystal film 3 which is wound onto the roller RL through the processes shown in FIG. 5 and FIG. 8 is prepared, and subsequently, part of the liquid crystal film 3 is brought into contact with the adhesive layer (silane coupling agent) 2 (step ST24).

Subsequently, the thermal release tape TP is heated (step ST25). By this heating, the adhesion of the thermal release tape TP is reduced.

Subsequently, the roller RL is rotated, and the liquid crystal film 3 is transferred to the upper side the adhesive layer 2 (step ST26). By this process, the liquid crystal film 3 is stacked on the adhesive layer 2.

Subsequently, the adhesive layer (silane coupling agent) 2 is heated (step ST26). By this process, the alkoxy group of the silane coupling agent is chemically bonded to the inorganic material which forms the main surface F2 of the transparent substrate 1. Further, the reactive functional group of the silane coupling agent is chemically bonded to the functional group of the liquid crystal film 3 which remains in an unreacted state.

By this process, the liquid crystal optical element 100 is manufactured.

Even when the above manufacturing method is applied, effects similar to those of the above description can be obtained.

In addition, the heating process for peeling the liquid crystal film 3 from the thermal release tape TP is unnecessary.

Now, this specification explains a silane coupling agent which can be applied in the embodiment.

FIG. 10 is a diagram schematically showing the chemical structure of a silane coupling agent.

In the silane coupling agent, the alkoxy group OR which is chemically bonded to the inorganic material forming the main surface of the transparent substrate 1 is, for example, a methoxy group, an ethoxy group or an acetyl group.

The reactive functional group Y which is chemically bonded to the liquid crystal film 3 in the silane coupling agent is, for example, an epoxy group, a styryl group, a mercapto group, an isocyanate group, a methacryl group, an acrylic group or an amino group.

FIG. 11 is a diagram showing examples of the silane coupling agent.

In the examples of FIG. 11, each silane coupling agent has an epoxy group, a styryl group, a mercapto group or an isocyanate group as the reactive functional group.

As the examples of a silane coupling agent having an epoxy group, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane and the like are considered.

As the examples of a silane coupling agent having a styryl group, p-styryltrimethoxysilane and the like are considered.

As the examples of a silane coupling agent having a mercapto group, 3-mercaptopropylmethyldimethoxysilane, 3-mercaptopropyltrimethoxysilane and the like are considered.

As the examples of a silane coupling agent having an isocyanate group, 3-isocyanatopropyltriethoxysilane and the like are considered.

FIG. 12 is a diagram showing other examples of the silane coupling agent.

In the examples of FIG. 12, each silane coupling agent has a methacryl group, an acrylic group or an amino group as the reactive functional group.

As the examples of a silane coupling agent having a methacryl group, 3-methacryloxypropylmethyldimethoxysilane, 3-methacryloxypropyltrimethoxysilane, 3-methacryloxypropylmethyldiethoxysilane, 3-methacryloxypropyltriethoxysilane and the like are considered.

As the examples of a silane coupling agent having an acrylic group, 3-acryloxypropyltrimethoxysilane and the like are considered.

As the examples of a silane coupling agent having an amino group, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)-propylamine, N-phenyl-3-aminopropyltrimethoxysilane and the like are considered.

As explained above, the embodiment can provide a manufacturing method of a liquid crystal optical element which can prevent the peel-off of a liquid crystal film.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a liquid crystal optical element, the method comprising:

preparing a liquid crystal material containing a liquid crystal monomer and a polymerization initiator;

forming an alignment film on a support substrate;

applying the liquid crystal material onto the alignment film;

forming a liquid crystal film by curing the liquid crystal material in a state which exhibits a cholesteric liquid crystal phase, the liquid crystal film including a first surface in contact with the alignment film and a second surface opposite the first surface;

attaching a thermal release tape to the liquid crystal film, the whole second surface of the liquid crystal film being in contact with the thermal release tape;

peeling the liquid crystal film from the alignment film;

preparing a transparent substrate in which a material forming a main surface is an inorganic material, the transparent substrate being neither a retardation film nor a polarizing film;

applying a solution containing a silane coupling agent to the main surface of the transparent substrate to form an adhesive layer;

stacking the liquid crystal film on the silane coupling agent, the whole first surface of the liquid crystal film being in contact with the silane coupling agent and the liquid crystal film being sandwiched between the thermal release tape and the adhesive layer;

heating the thermal release tape and the adhesive layer at a same time, an adhesion of the thermal release tape being reduced by heating, and an alkoxy group of the silane coupling agent being chemically bonded to the inorganic material forming the main surface, and a reactive functional group of the silane coupling agent being chemically bonded to a functional group of the liquid crystal film which remains in an unreacted state by heating; and peeling the thermal release tape from the liquid crystal film, wherein the transparent substrate, the adhesive layer and the liquid crystal film have same refractive index, the adhesive layer is transparent, and an adhesion of the adhesive layer is stronger than the adhesion of the thermal release tape after heating the thermal release tape.

2. The manufacturing method of claim 1, wherein the silane coupling agent is an organosilicon compound having the alkoxy group and the reactive functional group, and the reactive functional group is one of an epoxy group, a styryl group, a methacryl group, an acrylic group, an amino group, a mercapto group and an isocyanate group.

3. The manufacturing method of claim 1, wherein the solution is an aqueous solution or alcohol solution which contains the silane coupling agent in a range greater than or equal to 0.1% by weight and less than or equal to 3.0% by weight.

\* \* \* \* \*